(12) United States Patent
Brooker et al.

(10) Patent No.: US 8,930,364 B1
(45) Date of Patent: Jan. 6, 2015

(54) INTELLIGENT DATA INTEGRATION

(75) Inventors: Marc J. Brooker, Seattle, WA (US); Madhuvanesh Parthasarathy, Renton, WA (US); Tate Andrew Certain, Seattle, WA (US); Kerry Q. Lee, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/434,728

(22) Filed: Mar. 29, 2012

(51) Int. Cl.
*G06F 17/30* (2006.01)

(52) U.S. Cl.
CPC .... *G06F 17/30017* (2013.01); *G06F 17/30345* (2013.01)
USPC .......... 707/736; 707/764; 707/E17.044; 707/E17.032; 711/162; 711/100; 714/4.11; 709/214; 709/233; 709/241

(58) Field of Classification Search
CPC .............. G06F 17/30017; G06F 17/30; G06F 17/30315; G06F 17/30312; G06F 17/30345; G06F 17/30477; G06F 17/00; G06F 17/2247; G06F 17/227; G06F 17/2775; G06F 17/2785; G06F 17/30153; G06F 17/30289; G06F 17/30303
USPC .................. 707/736, 764, 655, 610, E17.005, 707/E17.044, E17.032, 999.202; 711/162, 711/100, E12.001, E12.103; 714/4.11; 709/214, 241, 245, 223, 238; 370/399, 370/400, 229, 235, 231, 449
See application file for complete search history.

(56) References Cited

U.S. PATENT DOCUMENTS

| | | | |
|---|---|---|---|
| 6,681,239 B1 | 1/2004 | Munroe et al. | |
| 6,779,095 B2 | 8/2004 | Selkirk et al. | |
| 7,096,341 B1 * | 8/2006 | DeTar et al. | 711/210 |
| 7,337,331 B2 | 2/2008 | Yoshida | |
| 7,640,298 B2 * | 12/2009 | Berg | 709/203 |
| 7,925,624 B2 * | 4/2011 | Vosshall et al. | 707/610 |
| 8,136,025 B1 * | 3/2012 | Zhu et al. | 707/740 |
| 8,364,648 B1 * | 1/2013 | Sim-Tang | 707/674 |
| 8,442,940 B1 * | 5/2013 | Faletti et al. | 707/610 |
| 8,578,127 B2 | 11/2013 | Thatcher | |
| 8,756,375 B2 | 6/2014 | Flynn | |
| 2002/0165942 A1 | 11/2002 | Ulrich et al. | |
| 2002/0165985 A1 * | 11/2002 | Chen et al. | 711/147 |
| 2003/0041147 A1 | 2/2003 | van den Oord et al. | |
| 2003/0140210 A1 | 7/2003 | Testardi | |
| 2005/0160243 A1 | 7/2005 | Lubbers et al. | |
| 2005/0204108 A1 * | 9/2005 | Ofek et al. | 711/162 |

(Continued)

OTHER PUBLICATIONS

Kun Wang; Qiang Guo; and Jindong Wang—"Research on Security Function Component Model of Intelligent Security Defense Scheme"—Artificial Intelligence and Computational Intelligence (AICI), 2010 International Conference on (vol. I) Date of Conference: Oct. 23-24, 2010—pp. 129-133.*

(Continued)

*Primary Examiner* — Anh Ly
(74) *Attorney, Agent, or Firm* — Kilpatrick Townsend & Stockton LLP

(57) ABSTRACT

A storage controller is implemented for controlling a storage system. The storage controller may be implemented using a distributed computer system and may include components for servicing client data requests based on the characteristics of the distributed computer system, the client, or the data requests. The storage controller is scalable independently of the storage system it controls. All components of the storage controller, as well as the client, may be virtual or hardware-based instances of a distributed computer system.

23 Claims, 10 Drawing Sheets

(56) References Cited

U.S. PATENT DOCUMENTS

| | | | |
|---|---|---|---|
| 2006/0010227 A1* | 1/2006 | Atluri | 709/217 |
| 2006/0059253 A1 | 3/2006 | Goodman et al. | |
| 2006/0167979 A1* | 7/2006 | Fuchs et al. | 709/203 |
| 2007/0016754 A1* | 1/2007 | Testardi | 711/206 |
| 2007/0143559 A1 | 6/2007 | Yagawa | |
| 2007/0260834 A1* | 11/2007 | Kavuri et al. | 711/162 |
| 2008/0177994 A1* | 7/2008 | Mayer | 707/E17.014 |
| 2008/0189043 A1* | 8/2008 | Anno et al. | 702/14 |
| 2009/0031097 A1 | 1/2009 | Nelson | |
| 2009/0089409 A1 | 4/2009 | Pasko et al. | |
| 2009/0150605 A1 | 6/2009 | Flynn et al. | |
| 2009/0271412 A1* | 10/2009 | Lacapra et al. | 707/10 |
| 2009/0313503 A1* | 12/2009 | Atluri et al. | 714/19 |
| 2010/0110935 A1* | 5/2010 | Tamassia et al. | 370/256 |
| 2010/0114941 A1 | 5/2010 | Von Kaenel et al. | |
| 2010/0174731 A1 | 7/2010 | Vermeulen et al. | |
| 2010/0211737 A1 | 8/2010 | Flynn et al. | |
| 2010/0251341 A1 | 9/2010 | Kijima | |
| 2010/0333116 A1 | 12/2010 | Prahlad et al. | |
| 2011/0055494 A1* | 3/2011 | Roberts et al. | 711/154 |
| 2011/0184920 A1* | 7/2011 | Vosshall et al. | 707/690 |
| 2011/0196828 A1* | 8/2011 | Drobychev et al. | 707/622 |
| 2011/0196833 A1 | 8/2011 | Drobychev et al. | |
| 2011/0196838 A1* | 8/2011 | Zunger et al. | 707/636 |
| 2011/0196900 A1* | 8/2011 | Drobychev et al. | 707/812 |
| 2011/0246456 A1 | 10/2011 | Weitz et al. | |
| 2012/0079225 A1* | 3/2012 | Suishu et al. | 711/162 |
| 2012/0124306 A1* | 5/2012 | Abercrombie et al. | 711/162 |
| 2012/0260040 A1 | 10/2012 | Mallge et al. | |
| 2012/0284329 A1 | 11/2012 | van den Oord et al. | |
| 2012/0304286 A1 | 11/2012 | Croll et al. | |
| 2013/0117219 A1* | 5/2013 | Malka et al. | 707/603 |
| 2013/0198165 A1* | 8/2013 | Cheng et al. | 707/714 |

OTHER PUBLICATIONS

W Wong, p. Nikander—2010—conferences.npl.co.uk—"Towards Secure Information-centric Naming" Oct. 2010 pp. 1-8.*
U.S. Appl. No. 13/434,666, filed Mar. 29, 2012, Titled: Distributed Data Storae Controller.
U.S. Appl. No. 13/434,638, filed Mar. 29, 2012, Titled: Data Storage Mapping and Management.
U.S. Appl. No. 13/434,551, filed Mar. 29, 2012, Titled: Environment Sensitive Distributed Data Management.
Fusaro, et al., "Biomedical Cloud Computing with Amazon Web Services", PLOS Computational Biology Open Access Freely Available Online, Aug. 2011, vol. 7, Issue 8, pp. 1-5.

* cited by examiner

INTELLIGENT DATA INTEGRATION

CROSS-REFERENCE TO RELATED APPLICATIONS

This application is related to and incorporates by reference for all purposes the full disclosure of co-pending U.S. patent application Ser. No. 13/434,666, filed concurrently herewith, entitled "DISTRIBUTED DATA STORAGE CONTROLLER", co-pending U.S. patent application Ser. No. 13/434,638, filed concurrently herewith, entitled "DATA STORAGE MAPPING AND MANAGEMENT", and co-pending U.S. patent application Ser. No. 13/434,551, filed concurrently herewith, entitled "ENVIRONMENT-SENSITIVE DISTRIBUTED DATA MANAGEMENT".

BACKGROUND

As the need and demand for higher capacity, higher performance enterprise data storage solutions has increased, the complexity of such storage configurations and topologies has also increased. Accordingly, the computing resources required to track or map the location of data can be substantial, and enterprises have historically invested in often expensive dedicated resources to handle such tracking and mapping functions when requisitioning high performance, high available storage solutions. The addition or maintenance of such additional computing resources can often have a significant impact on an organization, possibly being disruptive and/or decreasing productivity. Additionally, such solutions typically do not automatically scale their capabilities up and down based on demand, additional storage capacity, and/or the like.

BRIEF DESCRIPTION OF THE DRAWINGS

Various embodiments in accordance with the present disclosure will be described with reference to the drawings, in which.

DETAILED DESCRIPTION

Figure 1:
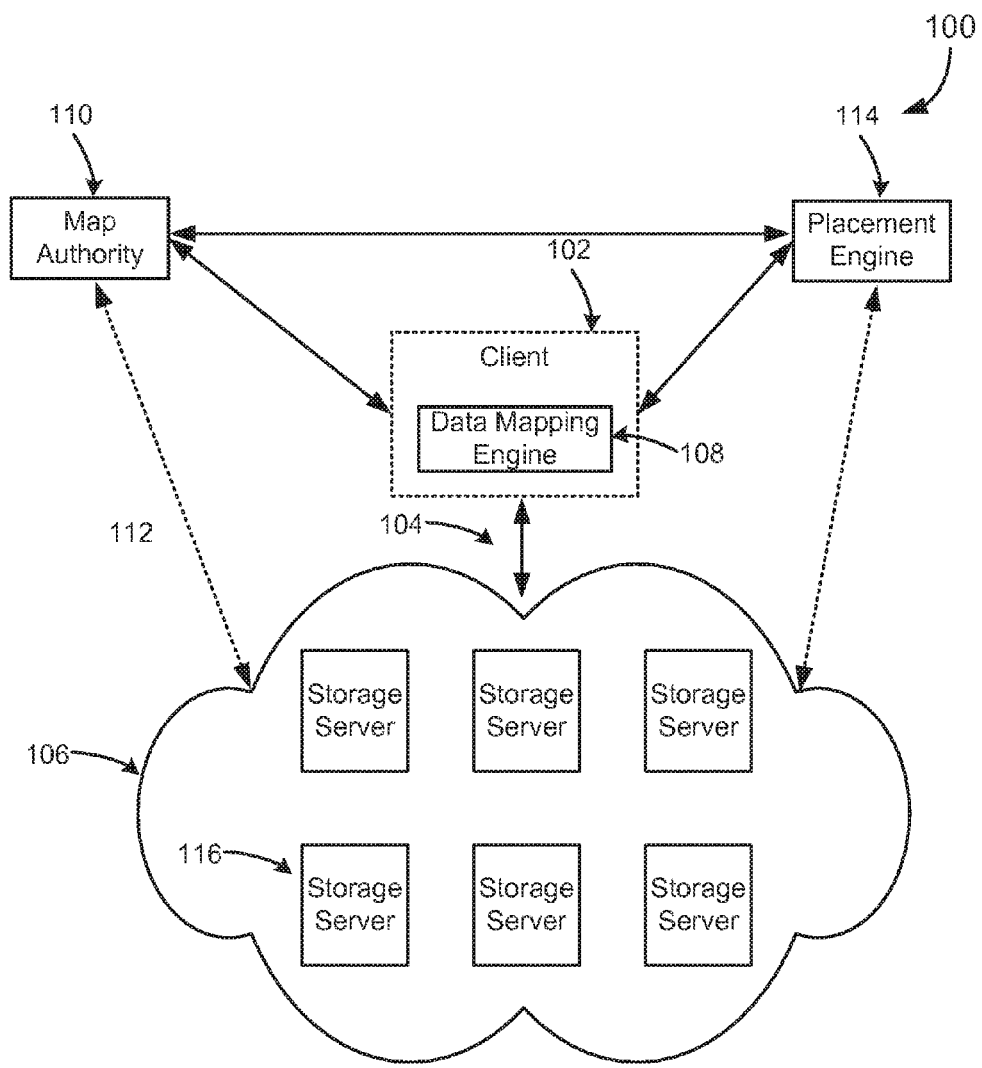
FIG. 1 illustrates an example of an environment that can be used in accordance with at least one embodiment.

Systems and methods in accordance with various embodiments of the present disclosure may overcome one or more of the aforementioned and other deficiencies experienced in conventional approaches to providing access to data in an electronic environment. In particular, various embodiments provide data storage, data access and related services to client entities via a computing resource provider that provides one or more computing resources through computing resource services, such as Web services. For example, a client or client entity may access, through such a computing resource service, data storage such that access mechanisms are implemented and provided to the client entity utilizing the computing resources. Computing resource services may include one or more computing resources accessible across a network through an application programming interface (API), user interface (UI), or other interface where the one or more computing resources are scalable and expandable as needed for the client, the number of storage nodes, and the like. In an embodiment, the client itself comprises one or more computing resources of the computing resource provider.

In some embodiments, a data mapping engine is implemented by a client entity to access data residing on one or more storage servers across one or more networks. In an embodiment, the data mapping engine implements a logical block addressing (LBA) map, which acts as a translation layer between client requests for specific blocks of data and retrieving the data on the specific data storage servers or volumes upon which it resides. Such requests may include both client write requests and client read requests. In some embodiments, the data mapping engine may rely upon a placement engine for determining an appropriate storage server or servers from which to read or write data relating to incoming data requests from the client. Such an placement engine may, in some embodiments, have general or specific information about the state of the storage servers, the nature of the data requests, the nature of the data itself, the nature of the client, or any other information about the distributed system that may improve the availability engine's ability to determine an appropriate storage server or servers to service a client's data request. In some embodiments, the data mapping engine may work in conjunction with a separate map authority. The map authority retains a copy of the LBA map and may, in some embodiments, serve as a backup of the LBA map actively being used by the client to access and administer underlying data. In some embodiments, the map authority retains the active copy of the LBA map. Any combination of the data mapping engine, the map authority, and the placement engine may be implemented within the client itself. In some embodiments, the functionality of each of the data mapping engine, the map authority, and the placement engine may overlap with or duplicate functionality of another.

As noted above, in some embodiments, the map authority updates the data mapping engine implemented within the client with an updated LBA map, and in other embodiments, the reverse occurs. Such updates to the map may occur for both reactive and proactive reasons. For example, the map authority may update the LBA map in reaction to notification or information that a dropped network connection, failed storage node, or other system abnormality has rendered some or all of the mapped data inaccessible. As another example, the map authority may preemptively update the LBA map if it detects or receives notification that the current data mapping is performing inefficiently. In some embodiments, the updating of the LBA map is coincident with a command from the map authority to reallocate, move, or otherwise alter the configuration or data assigned to the storage nodes. In some embodiments, some other entity than the map authority, including the storage nodes themselves, notifies the map authority of an effected or presently occurring configuration change to the location of data among the storage nodes, whereupon the map authority updates the LBA map with the new configuration.

In some embodiments, a placement engine informs the data mapping engine as to an optimal or otherwise appropriate location among the storage nodes for given data. The placement engine, in some embodiments, has broader information about the current, past and predicted future status of the distributed system, including, for example, individual server node capabilities, network topology, network performance, client demand patterns, the nature of the data to be written or read, geographic location of the system's individual components, and the like. In some embodiments, the placement engine uses the information at its disposal to determine an optimal mapping configuration for a given piece of data, and in some embodiments places the data in within the determined mapping configuration in accordance with a requestor's intended usage of that data. As may be contemplated, and as previously alluded to, such functionality may in some embodiments be integrated into another entity such as the map authority or the data mapping engine, or expressed as a standalone module with which other functional entities may interface.

Certain techniques for moving data may be used in order to ensure data integrity, continued performance and maximum availability in accordance with several embodiments described herein. For example, a given data block may be replicated from one storage node to another. During the replication, any changes to the data block being replicated may result in different versions of constituent chunks of the data block on the originating and receiving storage nodes. In some embodiments, techniques for identifying and categorizing such data chunks are implemented, including but not limited to write journaling, data differencing, and consistency tagging. Such techniques may be implemented by any entity described herein and may, in an embodiment, be incorporated into the LBA map itself. Upon utilizing such a technique and identifying that, for example, multiple storage nodes bear different data chunk versions within the same data block, the implementing entity may further determine, based on information about the data block, the client's intended use for the data contained within, and the nature of the storage nodes in question, the storage node or nodes upon which the entire data block the latest versions of all constituent data chunks should be replicated.

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

FIG. 1 illustrates an example of an environment 100 for implementing aspects in accordance with various embodiments. In this example, a client 102 connects, via one or more networks 104, to a storage system 106 in order to manipulate, retrieve or store data thereon. In some embodiments, the client is comprised of one or more computing resources in a distributed computing system. Such computing resources can either be hardware-based, software-based, dedicated, virtualized or configured in any appropriate fashion. Thus, a client may correspond with actual hardware devices, virtualized computer systems as will be discussed in FIG. 2, or any other appropriate configuration. The storage system may be composed of any number of storage nodes or storage servers 116, connected to one another by any appropriate type of interface (e.g., local bus protocols such as PCI or PCI Express, storage area network protocols such as Fibre Channel Protocol or iSCSI, general network data protocols such as TCP/IP, and the like). In an embodiment, the individual storage servers are configured into master-slave pairs. In some embodiments, the topology of the storage servers is freely configurable and/or freely assignable, either by the storage system or by another entity, such as the map authority, the data mapping engine, or the placement engine. In such embodiments, it is contemplated that any server may be designated as a master, or a slave to an existing master, for a given assigned block of data. In some embodiments, the actual configuration of the storage servers with the storage systems is obfuscated from the client or client instance. The one or more network connections used to connect the client and the storage system may either be pre-existing or purpose-built, and may be of any suitable technology to implement a chosen or implemented data transport protocol. In some embodiments, the existing network infrastructure and associated application and transport protocols, for example, NTP, FTP, HTTP, TCP, UDP, and the like, may be used to implement the connection. In some embodiments, the data transport protocol used between the client and the storage system and/or the respective constituent components or nodes thereof (e.g., between an implemented data mapping engine and the data storage system) may be an Internet Protocol (IP)-based storage network standard, such as iSCSI, Global Network Block Device (GNBD), or Fibre Channel over IP. In some embodiments, more specialized and/or generalized storage area network protocols such as Fibre Channel over Ethernet or Fibre Channel Protocol may be used.

In some embodiments, the client uses a subset of its allocated computing resources to implement a data mapping engine 108. For example, the data mapping engine may be implemented by using a virtualization engine on the client or client device. In some embodiments, the LBA map is operable to associate at least a portion of block addresses exposed to a client instance, such as a virtual instance of the client or a bare metal instance running directly on hardware, to one or more locations on the storage system. In this example, the data mapping engine serves at least as an abstraction layer between client data requests and storage system data requests. Such client data requests may emanate from any entity or instance of the client, such as a virtual machine instance of the client or a direct hardware-level or "bare metal" instance. In some embodiments, the abstraction layer is a logical block addressing (LBA) map that, as implemented, presents to a client or other data requester a known data organization and/or configuration, such as a data volume, file system (e.g., FAT, NTFS, HFS, ext3, and the like) or related construct. In some embodiments, the data mapping engine uses the LBA map to translate incoming reads and writes of data to the appropriate location, such as (a) particular storage node or nodes, in the storage system. The data mapping engine is, in an embodiment, configured to update the LBA map in accordance with changes to the structure, location or other configuration of the data stored upon the storage system. Such updates may be requested or initiated by several entities, including but not limited to the map authority, the storage server, the client, or the data mapping engine itself. In some embodiments, when the client writes new data to the storage system, the data mapping engine determines an appropriate location within the storage system to which to make the write, then writes to that location and updates the LBA map. In some embodiments, when the client requests data from the storage system, the data mapping engine determines an appropriate location within the storage system that is able to service the request, then retrieves the data. During these operations, the data mapping engine may track characteristics regarding the operation, such as latency, data storage availability, performance characteristics, and the like. Such tracked characteristics may be used by the data mapping engine, the map authority, or the placement engine to process and optimize future operations.

In some embodiments, the map authority 110 retains a copy of the LBA map. The client 102 may, in some embodiments, be ephemeral, and it may be desirable to retain a copy of the active LBA map separately such that, the client is free to dissolve or disassociate without losing the ability, upon future instantiations or connections, to access the data stored upon the storage system in accordance with the map. Upon the client's reappearance, or upon authorization of the client to connect with the storage system, in some embodiments, the map authority provides the client with the LBA map. In addition, while the client is modifying the data and the LBA map, the map authority's copy of the LBA map may be continuously synchronized with that of the client. Conversely, in some embodiments, the map authority is able to make changes to the LBA map copy under its control if certain triggering events or conditions occur, in which case the client's copy of the LBA map may, in some embodiments, also be updated. Examples of such events and conditions include a fault of a portion of the storage system, a partial or complete disconnection of a constituent network, network partitions, changes in access latency or queue depths for certain data or storage servers, and other performance, availability, and/or business-related events and conditions. The map authority may become aware of triggering events and conditions by any appropriate method, including active monitoring by the map authority or other entity, or by notification by an entity, such as a client. Upon acquiring information of one or more triggering event or condition, the map authority may devise a mitigation plan that may be permanent, semi-permanent or temporary, in response. Such a plan may include, for example, moving data from a slow storage server to a faster one, splitting a data block stored on one storage server onto multiple storage servers, merging a data block stored upon multiple storage servers onto a single storage server, and the like. In the example given, the map authority is optionally connected to the storage system 106 via one or more networks 112. The map authority may connect with the storage server through the network 112 and directly execute the mitigation plan, then notify the client with the updated mapping. Alternatively, it may devise the plan and instruct the client to execute the plan through the client's connection with the storage system 104, implicitly updating the client's copy of the LBA map. It is contemplated that the map authority, as well as any and all entities described herein, are, in some embodiments, capable of providing all services described herein to a plurality of entities. For example, a given map authority may provide a plurality of maps to a plurality of clients connecting with, or authorized to connect with, the storage system. In addition, all entities described herein are implementable across any number of resources so as to improve availability, durability, performance or for any appropriate reason. For example, a map authority may be implemented across multiple computer systems to ensure that the LBA maps stored thereon are protected from hardware failure of one or more components of one or more computer systems.

In some embodiments, the data mapping engine interacts with a placement engine 114 and, in some embodiments, with the client. In the present example, the placement engine is responsible for determining, or helping the data mapping engine to determine, optimal configurations for data placement within the storage system based at least in part on the client's data access patterns, as well as the data itself. For example, a certain chunk or block of data may be written by the client using an application known to the placement engine to use a high frequency of random accesses, and to be used frequently by the client. In this example, the placement engine may then direct the data mapping engine to write to, for example, a storage server with solid state disks (SSDs) capable of fast random access reads and writes, and as close as possible to the client in the network topology in order to reduce latency and improve throughput. Such optimizations may be self-initiated by the placement engine or requested and/or triggered by an activity or even of the client, map authority, storage system, computer system, or other entity. It is contemplated that such a placement engine may, in some embodiments, work synergistically with, or in some embodiments at least partially execute or subsume, proactive optimizations instigated by the map authority as described above.

Figure 2:
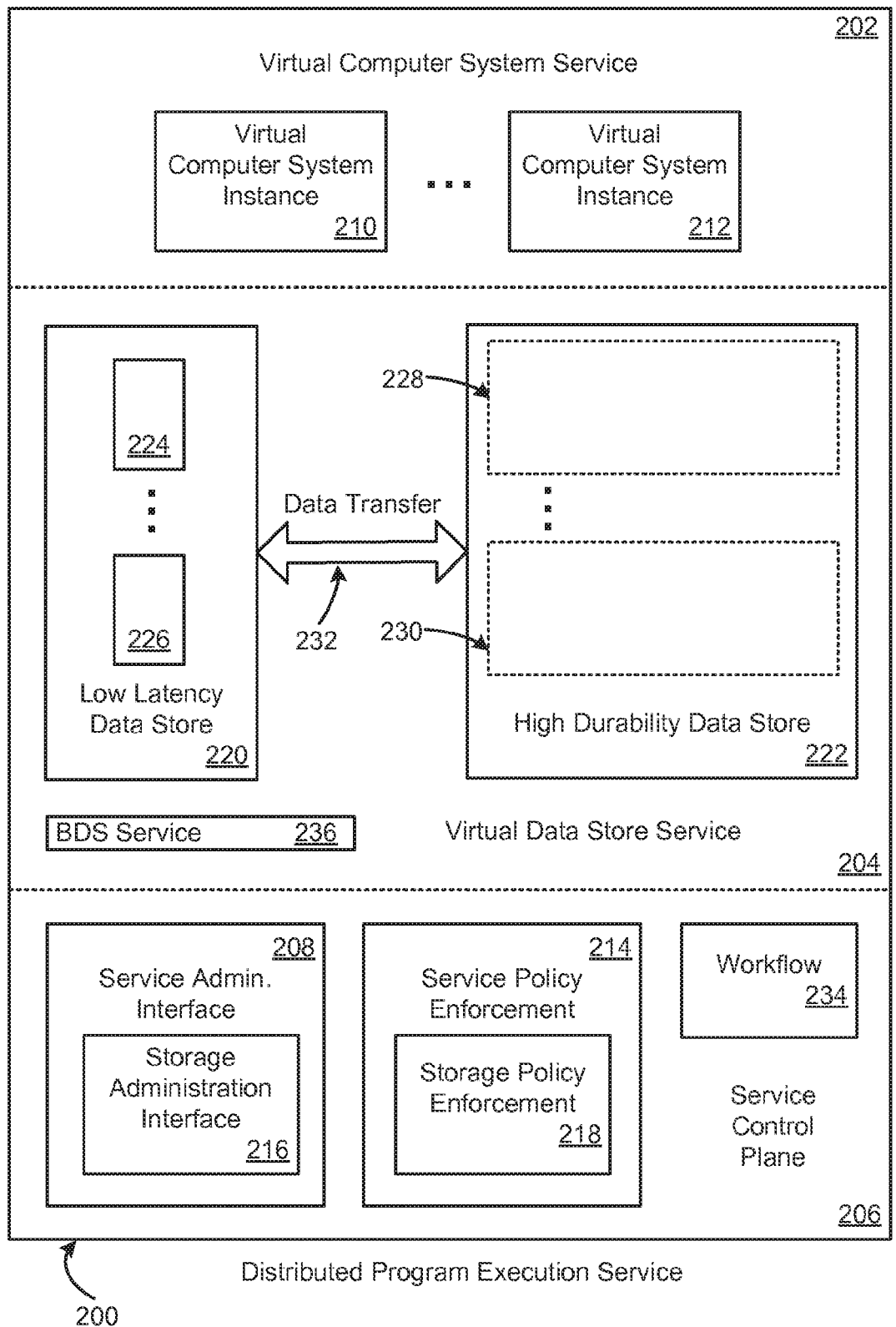
FIG. 2 illustrates an example of a distributed program execution service that can be used to implement aspects of at least one embodiment.

In at least one embodiment, one or more aspects of the environment 100 may incorporate and/or be incorporated into a distributed program execution service. FIG. 2 depicts aspects of an example distributed program execution service 200 in accordance with at least one embodiment. The distributed program execution service 200 provides computing services, including a virtual computer system service 202 and a virtual data store service 204, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers, one or more data stores such as the storage system 106 of FIG. 1, as well as communication bandwidth in the interlinking network. The computing resources managed by the distributed program execution service 200 are not shown explicitly in FIG. 2 to emphasize an independence of the computing services from the computing resources that implement them. However, in some embodiments, the computing services may correspond to actual resources rather than being virtualized.

The distributed program execution service 200 may utilize the computing resources to implement the computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the computing services, the distributed program execution service 200 may supply computing resources elastically and/or on-demand, for example, associated with a per resource unit commodity-style pricing plan.

The distributed program execution service 200 may further utilize the computing resources to implement a service control plane 206 configured at least to control the computing services. In some embodiments, the service control plane may be implemented as a virtual computer system instance. The service control plane 206 may include a service administration interface 208. The service administration interface 208 may include a Web-based user interface configured at least to enable users and/or administrators of the virtualized computing services to provision, de-provision, configure and/or reconfigure (collectively, "provision") suitable aspects of the computing services. For example, a user of the virtual computer system service 202 may provision one or more virtual computer system instances 210, 212 such as the client 102 of FIG. 1. The user may then configure the provisioned virtual computer system instances 210, 212 to execute the user's application programs. The ellipsis between the virtual computer system instances 210 and 212 indicates that the virtual computer system service 202 may support any suitable number (e.g., thousands, millions, and more) of virtual computer system instances although, for clarity, only two are shown.

The service administration interface 208 may further enable users and/or administrators to specify and/or re-specify virtualized computing service policies. Such policies may be maintained and enforced by a service policy enforcement component 214 of the service control plane 206. For example, a storage administration interface 216 portion of the service administration interface 208 may be utilized by users and/or administrators of the virtual data store service 204 to specify virtual data store service policies to be maintained and enforced by a storage policy enforcement component 218 of the service policy enforcement component 214. Various aspects and/or facilities of the virtual computer system service 202 and the virtual data store service 204 including the virtual computer system instances 210, 212, the low latency data store 220, the high durability data store 222, and/or the underlying computing resources may be controlled with interfaces such as application programming interfaces (APIs) and/or Web-based service interfaces. In at least one embodiment, the control plane 206 further includes a workflow component 246 configured at least to interact with and/or guide interaction with the interfaces of the various aspects and/or facilities of the virtual computer system service 202 and the virtual data store service 204 in accordance with one or more workflows.

In at least one embodiment, service administration interface 208 and/or the service policy enforcement component 214 may create, and/or cause the workflow component 246 to create, one or more workflows that are then maintained by the workflow component 246. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 208. As another example, a policy enforcement workflow may be created from a policy enforcement workflow template configured with parameters by the service policy enforcement component 214.

The workflow component 234 may modify, further specify and/or further configure established workflows. For example, the workflow component 234 may select particular computing resources of the distributed program execution service 200 to execute and/or be assigned to particular tasks. Such selection may be based at least in part on the computing resource needs of the particular task as assessed by the workflow component 234. As another example, the workflow component 234 may add additional and/or duplicate tasks to an established workflow and/or reconfigure information flow between tasks in the established workflow. Such modification of established workflows may be based at least in part on an execution efficiency analysis by the workflow component 234. For example, some tasks may be efficiently performed in parallel, while other tasks depend on the successful completion of previous tasks.

The virtual data store service 204 may include multiple types of virtual data store such as a low latency data store 220 and a high durability data store 222. For example, the low latency data store 220 may maintain one or more data sets 224, 226 which may be read and/or written (collectively, "accessed") by the virtual computer system instances 210, 212 with relatively low latency. The ellipsis between the data sets 224 and 226 indicates that the low latency data store 220 may support any suitable number (e.g., thousands, millions, and more) of data sets although, for clarity, only two are shown. In some embodiments, the high durability data store may maintain one or more data sets 228, 230, with the ellipsis between data sets 228 and 230, similarly to described above, indicating support for any suitable number of data sets. In some embodiments, the data sets 228, 230 correspond to captures, for archival purposes, of data sets 224 and 226, respectively. In some embodiments, data sets 228, 230 in the high durability data store may be accessed directly by the virtual computer system instances 210, 212. Although each component of the distributed program execution service 200 may communicate utilizing the underlying network, data transfer 232 between the low latency data store 220 and the high durability data store 222 is highlighted in FIG. 2 because, in some embodiments, the contribution to utilization load on the underlying network by such data transfer can be significant.

For example, the data sets 224, 226 of the low latency data store 220 may be virtual disk files (i.e., file(s) that can contain sequences of bytes that represents disk partitions and file systems) or other logical volumes. The low latency data store 220 may include a low overhead virtualization layer providing access to underlying data storage hardware. For example, the virtualization layer of the low latency data store 220 may be low overhead relative to an equivalent layer of the high durability data store 222. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 220 and the high durability data store 222, respectively, are substantially disjoint. In a specific embodiment, the low latency data store 220 could be a Storage Area Network target or the like. In this exemplary embodiment, the physical computer system that hosts the virtual computer system instance 210, 212 can send read/write requests to the SAN target.

The low latency data store 220 and/or the high durability data store 222 may be considered non-local and/or independent with respect to the virtual computer system instances 210, 212. For example, physical servers implementing the virtual computer system service 202 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 210, 212 may have a validity lifetime corresponding to the virtual computer system instance 210, 212, so that if the virtual computer system instance 210, 212 fails or is de-provisioned, the local data is lost and/or becomes invalid. In at least one embodiment, data sets 224, 226 in non-local storage may be efficiently shared by multiple virtual computer system instances 210, 212. For example, the data sets 224, 226 may be mounted by the virtual computer system instances 210, 212 as virtual storage volumes. As described at least in connection with FIGS. 1, 3 and 4, access by the virtual computer system instances or clients to such virtual storage volumes may also be dependent on the validity of the virtual computer system instances or clients.

Data stores in the virtual data store service 204, including the low latency data store 220 and/or the high durability data store 222, may be facilitated by and/or implemented with a block data storage (BDS) service 236, at least in part. The BDS service 236 may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 236 may facilitate and/or implement local caching of data blocks as they are transferred through the underlying computing resources of the distributed program execution service 200 including local caching at data store servers implementing the low latency data store 220 and/or the high durability data store 222, and local caching at virtual computer system servers implementing the virtual computer system service 202. In at least one embodiment, the high durability data store 222 is an archive quality data store implemented independent of the BDS service 236. The high durability data store 222 may work with sets of data that are large relative to the data blocks manipulated by the BDS service 236. The high durability data store 222 may be implemented independent of the BDS service 236, for example, with distinct interfaces, protocols and/or storage formats. In some embodiments, the functionality of the BDS service, or the BDS service itself, may comprise a subset of the resources of a virtual computer system instance 210, 212 or client 102, rather than reside in a part of the virtual data store service 204 or storage system 104.

Figure 3:
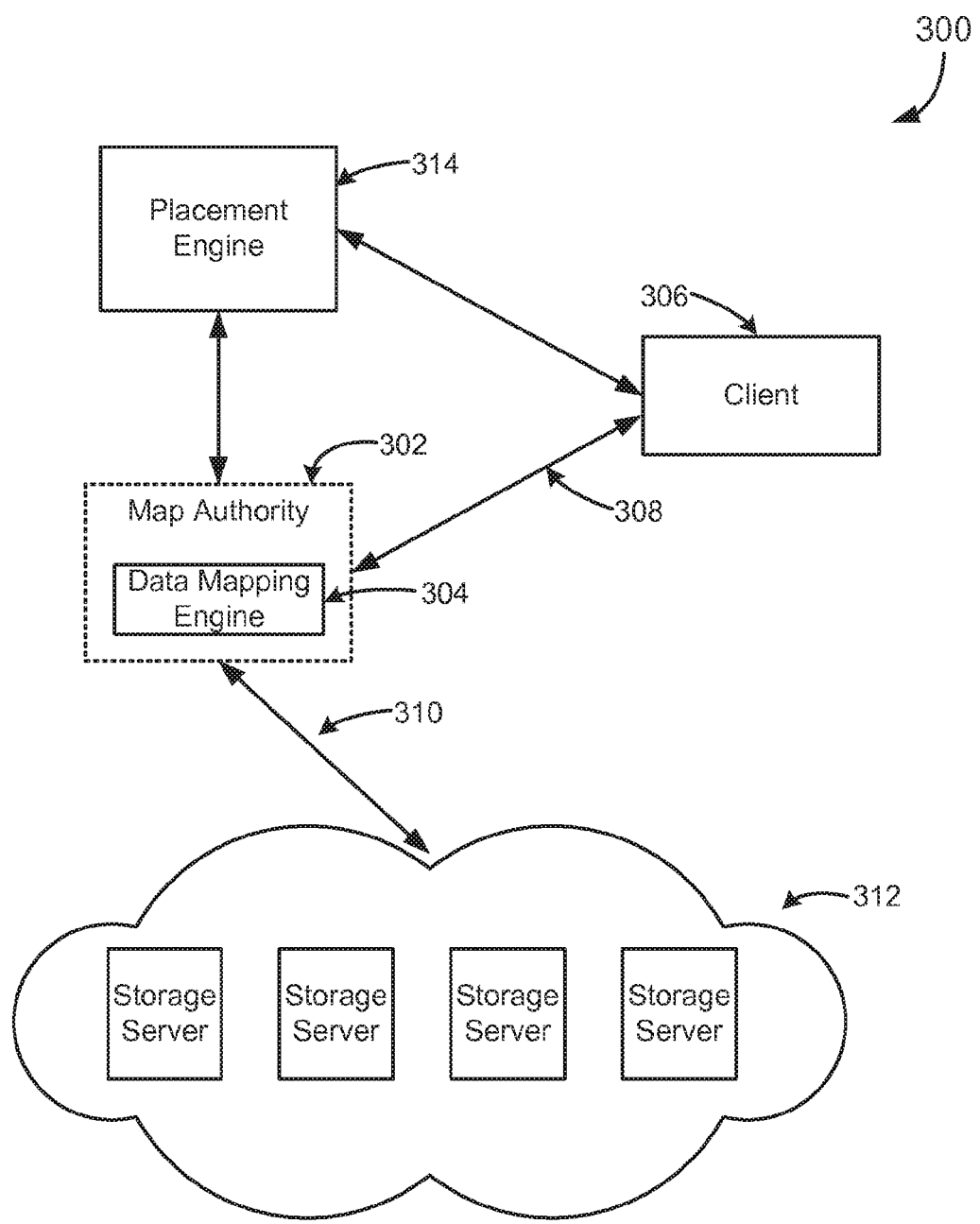
FIG. 3 illustrates an example of an environment that can be used in accordance with at least one embodiment.

As may be contemplated, the functionality of the map authority, data mapping engine and placement engine may be expressed in different combinations and configurations of components of the distributed program execution service 200. FIG. 3 illustrates an environment 300 where, in accordance with some embodiments, the map authority 302 and the data mapping engine 304 are integrated. In this example, client 306 sends data requests over one or more networks 308 to the data mapping engine via the map authority. In some embodiments, the data mapping engine functions similarly to that which is described in connection with FIG. 1 by at least implementing an LBA map also similar to that which is previously described. The client and the integrated map authority may be implemented by virtual computer system instances as described in connection with FIG. 2. The data mapping engine translates the requests using the LBA map in a fashion also similar to previously described, and sends the translated requests over one or more networks 310 to storage system 312, which may be implemented as at least a part of the virtual data store service described in connection with FIG. 2. In some embodiments, the data mapping engine, by virtue of being integrated with the map authority, persists the LBA map without the need for keeping a separate copy. Thus, in some embodiments, an ephemeral client may connect and disconnect without needing to synchronize two disparate LBA maps to retain access to data. Additionally, in some embodiments, any reactive or proactive updates may occur without needing to notify the client or synchronize LBA maps with the client. The placement engine 314, which may function similarly to the placement engine described above in connection with FIG. 1, may interact either with the client, the data mapping engine, or both. In some embodiments, the data mapping engine may, upon receiving a data request from the client, query the placement engine for an appropriate location within the storage system for retrieving or writing the data. In alternative embodiments, prior to submitting a data request to the map authority, the client may directly query the placement engine for such a storage location. The client may send the data request along with the placement engine's reply to the data mapping engine, which writes or reads data in accordance with both the data request and the metadata generated by the placement engine.

Figure 4:
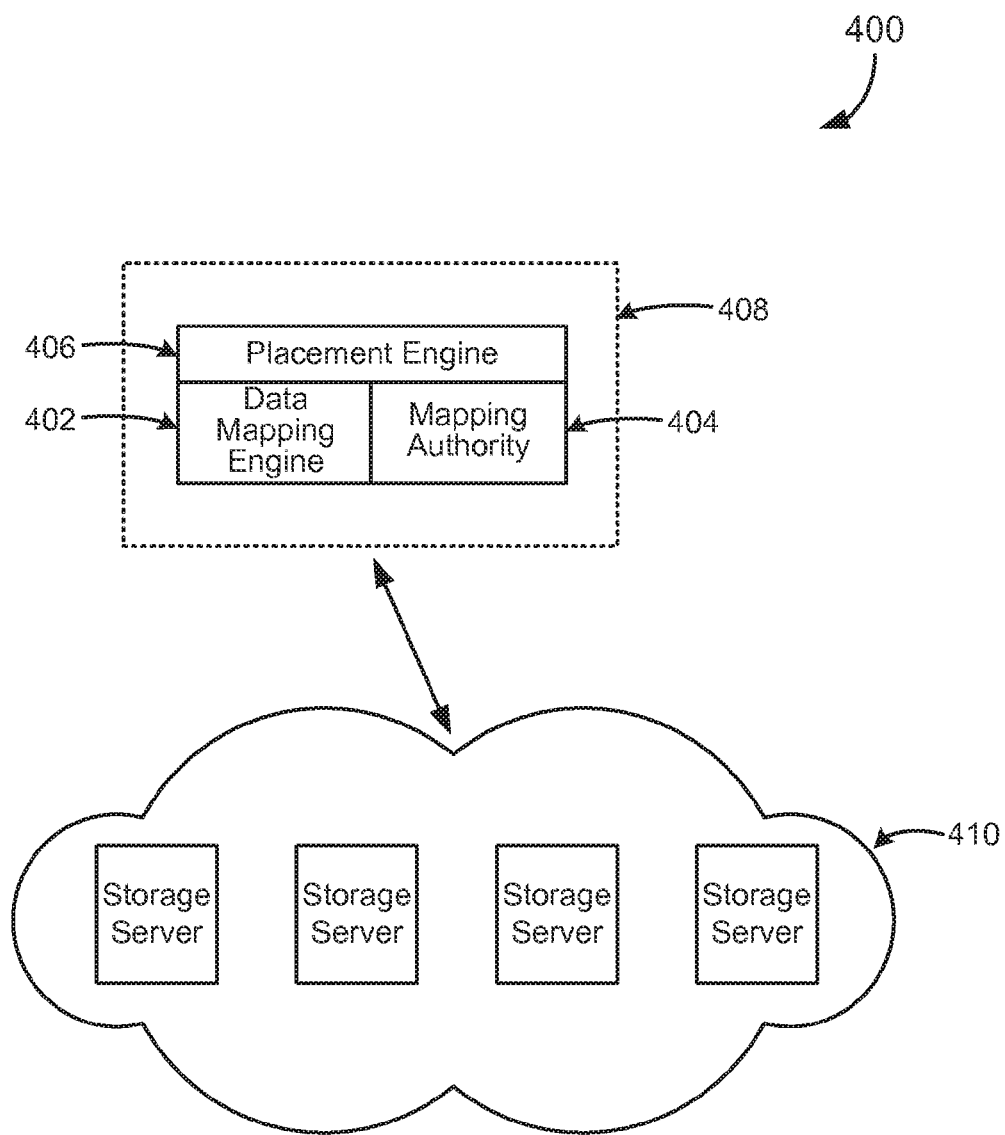
FIG. 4 illustrates an example of an environment that can be used in accordance with at least one embodiment.

FIG. 4 illustrates an environment 400 where each of the data mapping engine 402, the map authority 404, and the placement engine 406 are implemented as part of a client 408, in accordance with some embodiments. The client may, in some embodiments, be a subset of resources, either virtual or physical, of a distributed computing system, as described at least in connection with FIG. 1. The data mapping engine, the map authority, and the placement engine function similarly to the mapping engine, map authority, and placement described above in connection with at least FIGS. 1 and 3. Vesting the functionality of data mapping engine, the map authority, and the placement engine in the client provides several advantages if the client is permanent or only needs the data it stores upon the storage system 410 while it exists. For example, as will be contemplated, the amount of resources of the implementing distributed system necessary to service or access the storage system is less than if the components are implemented separately from the client. In addition, in some embodiments, the overall latency in servicing a client data request is theoretically lower if all components are bundled with the client. However, as may be appreciated, if a client using a configuration similar to the instant example is destroyed, the mapping to the underlying stored upon the storage server is also destroyed, and the data is orphaned. Various techniques to recover or discard such orphaned data, such as periodic garbage collection, may be employed by the storage system or by future clients so as to preserve the data or free the storage system resources for future clients.

Figure 5:
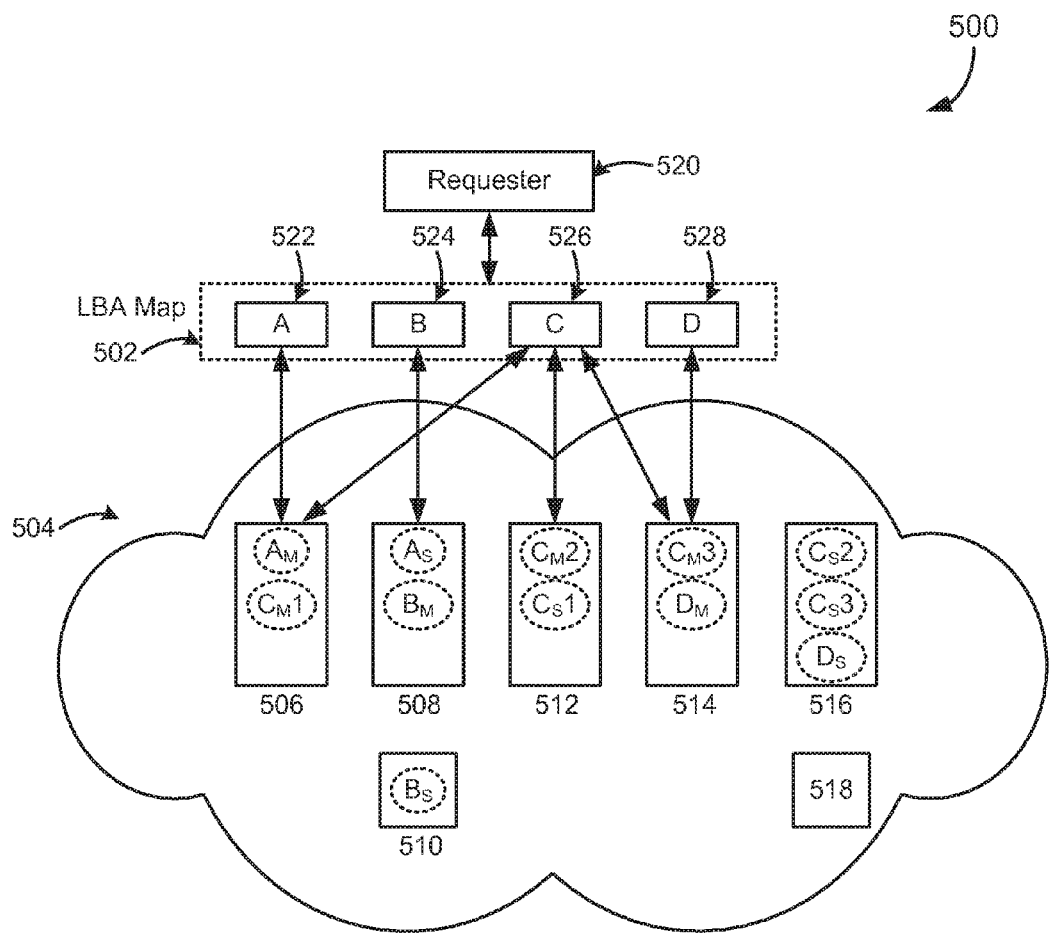
FIG. 5 illustrates an example configuration of a logical block addressing map for data, in accordance with at least one embodiment.

FIG. 5 illustrates an example environment 500 for implementing an LBA map 502 in accordance with some embodiments. As previously noted in connection with FIGS. 1-4, the LBA map is implemented by a data mapping engine that may or may not reside upon a client, but is otherwise implemented by a larger distributed system or distributed program execution service 200. The storage system 504, similarly to storage systems described in connection with FIGS. 1, 3 and 4 may in some embodiments be implemented by a virtual data store service 204 as described in connection with FIG. 2. The storage nodes 506-518 may correspond to, or be implemented by, a low latency data store 220, a high durability data store 222, the block data service 248, or any combination or comprising component thereof. The storage system and storage nodes may alternatively correspond to physical storage servers or other discrete storage system. It is contemplated that at least in some embodiments, the storage nodes have differing characteristics and/or capabilities, and may incorporate aspects of both virtual data stores and physical storage systems.

In the example given, a requestor 520 may make requests to the data mapping engine for data in mapped data blocks 522-528, marked A, B, C and D in the illustrated example. A data request may include data comprising multiple data blocks, a single data block, or a subset of data within a data block. The mapped data blocks are mapped to one or more storage nodes on which the corresponding data block is stored. In some embodiments, a mapped data block corresponds to a master storage node and associated slave storage node for the stored data block. In some embodiments, the storage nodes are delocalized or flexibly configurable such that any storage node may serve as the master or slave node for a given data block. Additionally, existing master nodes may become slave nodes for a given data block and vice versa, and any storage node many serve multiple roles. In the example given, data block A uses storage node 506 as the master node and 508 as the slave node, while data block B uses storage node 508 as the master node and storage node 510 as the slave. Such flexibility is useful in certain triggering scenarios, such as a disruption in access of one or more storage node, and allows other storage nodes to replace failed or inaccessible nodes to retain uninterrupted access for the requester. In the example given, if for example data storage node 508 acting as a master for data block B and a slave for block A becomes inaccessible to the data mapping engine or map authority but retains connectivity with other nodes, a map authority or the storage system itself may reassign data storage node 510 to serve as a master node for data block B, and replicate both blocks A and B to another data storage node, such as node 518, to serve as a new slave node.

In some embodiments, multiple storage nodes may serve as master nodes for single data block. In the illustrated example, nodes 506, 512 and 514 serve as master nodes for data block C. As discussed in connection with FIG. 2, such a multiplexed configuration may be used to increase availability, reliability, data redundancy, performance, or some combination of these and other factors. Writes and reads relating to data block C may happen sequentially or in parallel among the assigned nodes, depending on the needs of the requestor and the characteristics of the data. It will be appreciated that updates to assigned nodes will result in the LBA map being updated. As previously mentioned in connection with FIG. 1, an LBA map may be updated by the map authority or the data mapping engine, and in some embodiments, such updating occurs in the background, e.g. by the map authority, and the updated map is pushed thereafter to an active LBA map instance, e.g. as implemented by a data mapping engine implemented by a client.

Figure 6:
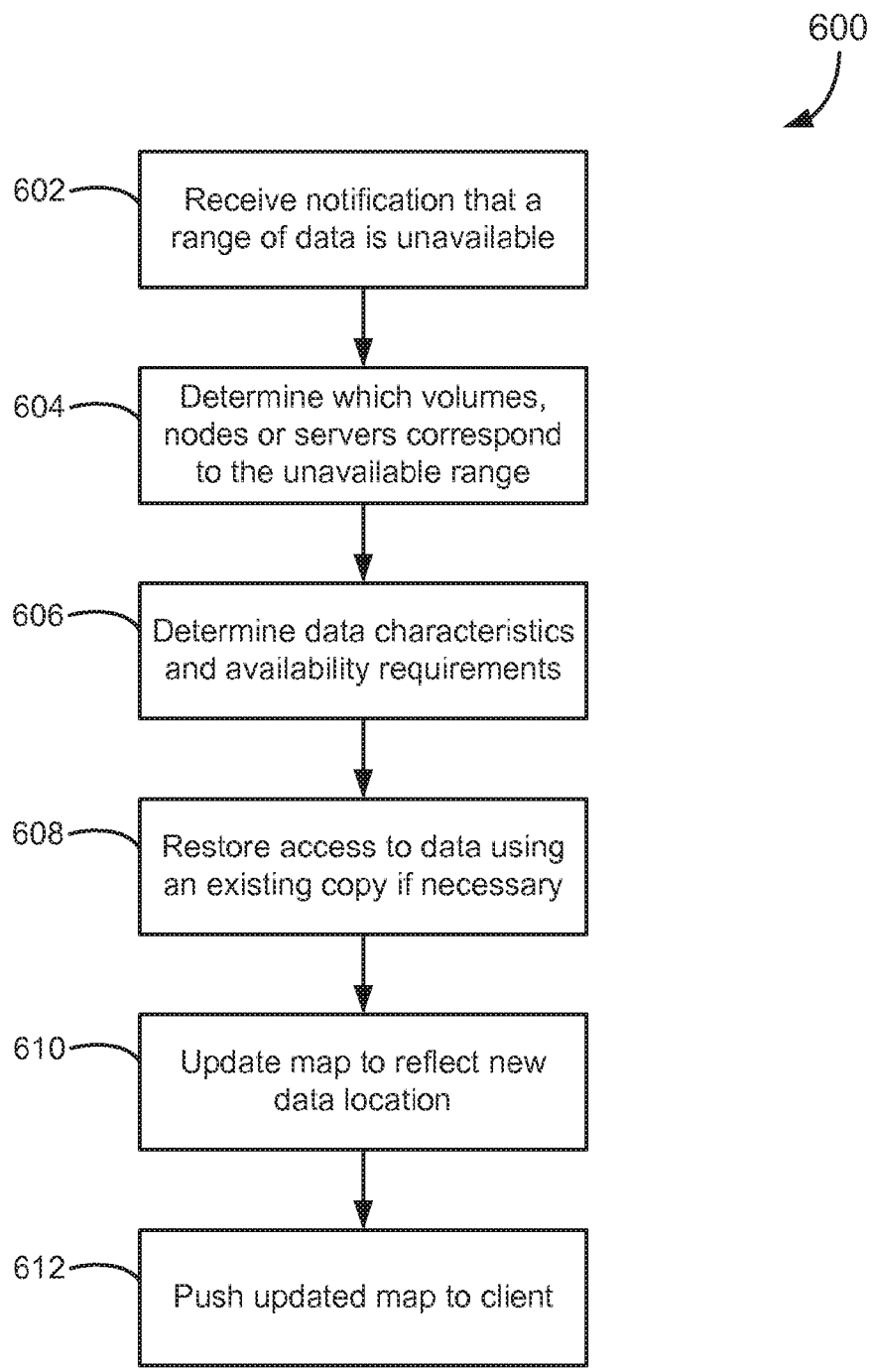
FIG. 6 illustrates an example process for remapping data in a distributed system, in accordance with at least one embodiment.

FIG. 6 illustrates an example process 600 for developing a mitigation plan updating an LBA map in response to data unavailability in accordance with various embodiments. As described in connection with the map authority and the data mapping engine of FIG. 1, the map authority or data mapping engine may devise such a mitigation plan to respond to a notification of data unavailability, which in some embodiments may incorporate some of the techniques discussed at least in FIGS. 1, 4 and 5. Some or all of the process 600 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In the illustrated example, an entity receives notification that a requested range of data is unavailable 602. The receiving entity may, in an exemplary embodiment, a map authority, although in other embodiments may include a client, a placement engine, and/or a data mapping engine. The notifying entity is, in some embodiments, the client, the storage system, the map authority, or the placement engine, but may also be any other entity capable of detecting that a requested range of data cannot be accessed from that entity. For example, a client may, through its implemented data mapping engine, unsuccessfully attempt to access a certain range or extent of data upon a storage system, and may report to the map authority and/or the placement engine that the data range or extent is unavailable. It will be appreciated that the data mapping engine in this example may, in addition or in the alternative, report the missing data range to itself, or from a different perspective, receive notification from the storage server that the data range cannot be accessed. Such missing or inaccessible data may be missing or inaccessible as the result of, for example, a network partition wherein a constituent storage node within the storage system cannot be accessed by the data mapping engine or other entity. As another non-limiting example, such data unavailability may be a normal part of the normal functioning of the overall system in a "virtual memory"-type model, wherein the LBA map being actively accessed by the requestor, e.g., a client, is not updated until a requested data range or extent is reported back as inaccessible or unavailable. In some embodiments, the client or other notifying entity may notify the entity directly with an indication of one or more events that caused or would cause data to be unavailable, including but not limited to network partitions, a lack of LBA map due to, for example, recent client creation, lost network connectivity to the storage server, or some other fault.

Upon receiving a notification of unavailability, the entity receiving the notification determines what storage units correspond to the unavailable data range or extent 604 and determines certain characteristics and requirements of the data 606. The storage units of step 604 may, in some embodiments, be individual storage nodes within the storage system, but may correspond to larger or smaller divisions of such nodes and/or systems or some combination of the nodes and/or systems. Such a determination may be based on the information attained by the entity in step 606 about the system topology and/or the entity's information about and/or analysis of the data in question, but may also be based on further information received from the notifying entity (for example, a data mapping engine's or storage system's own determination or notification to the entity that the data range resides on specific storage nodes). The determination of data characteristics and requirements in step 606 include, but are not limited to, customer usage patterns of the data, the size and/or fragmentation of the data extent or range, availability and persistence lifetime requirements of the data, and the like. The determination of step 606 may be executed entirely by the entity receiving the notification, such as the map authority, or in some embodiments may be conducted in at least partial reliance upon a secondary determination of another entity, such as a data mapping engine, a placement engine, a client, or a storage system.

Using, in some embodiments, the determinations of steps 604 and 606 above, the entity receiving the notification restores access to the data range or extent 608, updates the LBA map to reflect the new data location 610, then optionally pushes the updated LBA map to the entity that owns the actively used copy of the LBA map 612. In some embodiments, the entity restores data access by designating an existing slave node for the data range in question as a new master node, and optionally replicating the data range to a new slave node, using techniques similar to that described in connection with FIG. 5. The entity may, in some embodiments, determine that replication or reassignment is unnecessary or impossible, for example because the inaccessible data range is not accessed frequently enough to necessitate action to restore access to it, because access to the data range cannot be restored, or because the loss of access was determined to be temporary and the time needed to restore access and/or replicate the data to a new storage node exceeded the expected time of the accessibility outage. In some embodiments, as previously noted, the update to the LBA map may occur synchronously with a read or write, upon a write or read fault as in a "virtual memory" model, or asynchronously, for example, as a batched or scheduled process. Likewise, dependent on the implementation, updates to the entity's LBA map may or may not trigger a copy of the LBA map to an entity bearing the active LBA map. In some embodiments, as previously mentioned, the entity utilizing process 600 may also bear the active LBA map, thus obviating the need for step 612.

Figure 7:
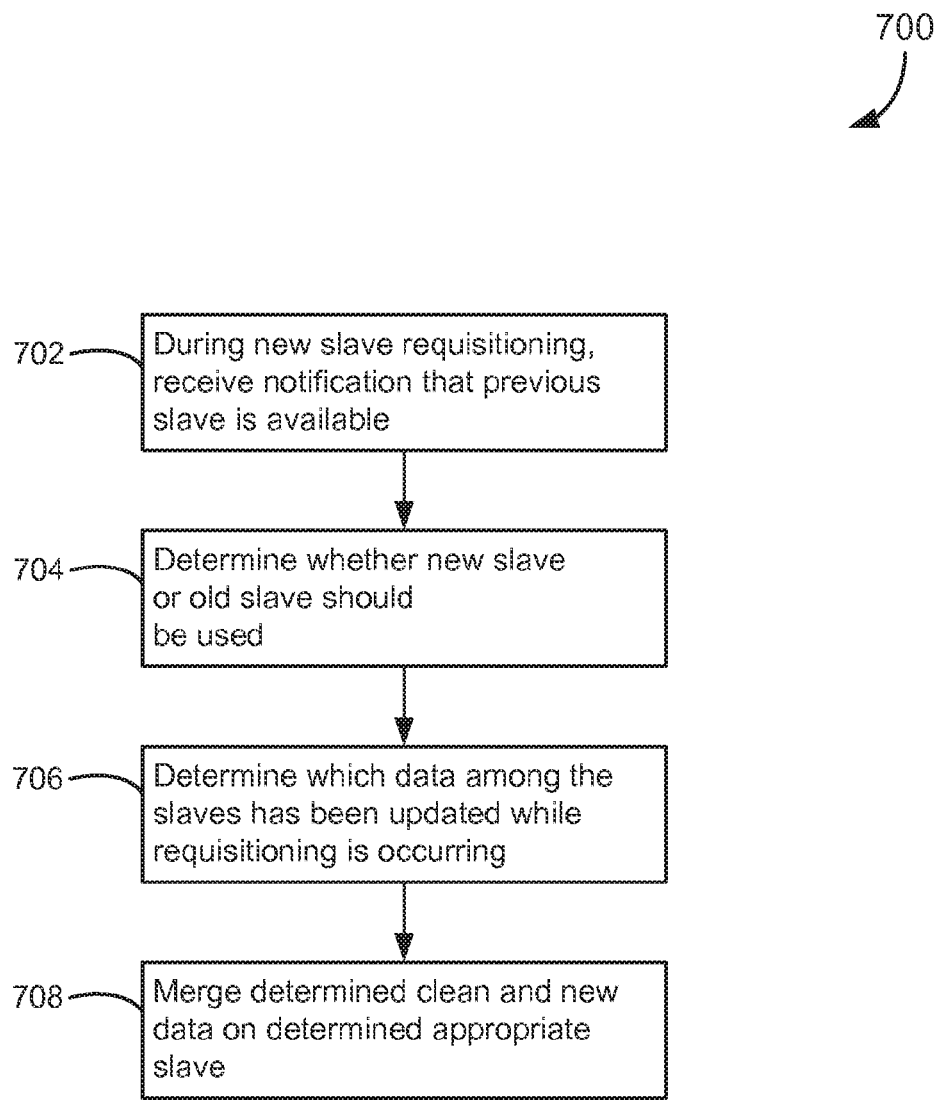
FIG. 7 illustrates an example process for merging data storage units in a distributed system, in accordance with an embodiment.

FIG. 7 illustrates an example process 700 for reassigning and requisitioning new data nodes in accordance with some embodiments. As described in connection with FIG. 6, when data is eligible to be reassigned from one storage node to another, the reassigning entity makes a determination as to whether to perform the reassignment and optional requisitioning of, e.g., new slave nodes. However, also as previously described, triggers of such reassignments may be temporary in nature, and in some cases, the responsible entity may receive notification that a previously unavailable storage node may again become available while a reassignment or replication to a new storage node is occurring 702. As will be appreciated, the entity performing example process 700 may be a map authority, a client, the data mapping engine, or any other appropriate entity with information about the both the data in question and of the storage system upon which it resides. The entity uses such information to determine whether replication of the data to the new storage node should continue or cease 704. For example, if the entity determines at the time of notification that the replication or reassignment of the data will soon be complete, the entity may decide to use the newly assigned node or continue replication of the data to the new node rather than revert to the old node. As an another example, if during the replication, the entity determines that the as yet incompletely replicated or reassigned new node contains a substantially newer set of data as compared to the older node, the entity may decide to continue the replication as the cost of reuniting the data upon old storage node with the data on the new storage node is greater than merely allowing the replication to proceed. By exemplary contrast, if the data set being reassigned is very large and the replication or reassignment will take substantially longer than reverting to the old storage node, or the entity determines that little or no data has been changed since the start of replication or reassignment, the entity may decide to unite the data upon the old storage node with that of the new storage node. These examples are not limiting in any way; an entity might consider any appropriate set of factors in making the determination of whether to continue or terminate a reassignment or replication of data to a new storage node, or whether to integrate or differentiate the data upon the respective storage nodes.

In some embodiments, the entity also determines which data on the target storage node, i.e., the new node to which the data has been reassigned, has changed relative to the "clean" data residing upon the previously used storage node 706. Such a determination may occur by a variety of techniques, including but not limited to the use of a write journal on either the storage node or on the client requesting the data to track writes and data versions, post-processing the data using one of a number of appropriate data differencing algorithms, and/or the use of consistency tags on each chunk of stored data. For example, in an embodiment, stored data chunks bearing such consistency tags may be organized into a data structure such as a hash or Merkle tree. The data structure may then be traversed to determine, comparatively, which chunk's hash value indicates the newest version of the given data chunk. Such examples are exemplary and not intended to be limiting in any way.

Upon determining the changed data and whether to integrate data from the old storage node, the entity merges the data upon the determined target storage node and optionally updates the LBA map to reflect the new organization 708. The data merge may take place using similar techniques as discussed in connection with step 706, such as the use of hash trees or data differencing algorithms. In addition, the LBA map update may occur using at least any technique or embodiment described in conjunction with FIG. 6, e.g., synchronously with the completion of a reassignment or replication, or not at all until a data requestor's data request results in a fault. In some embodiments, unused storage nodes resulting from the process 700 may be cleared or marked as available for subsequent data writes, reassignments, or replications.

Figure 8:
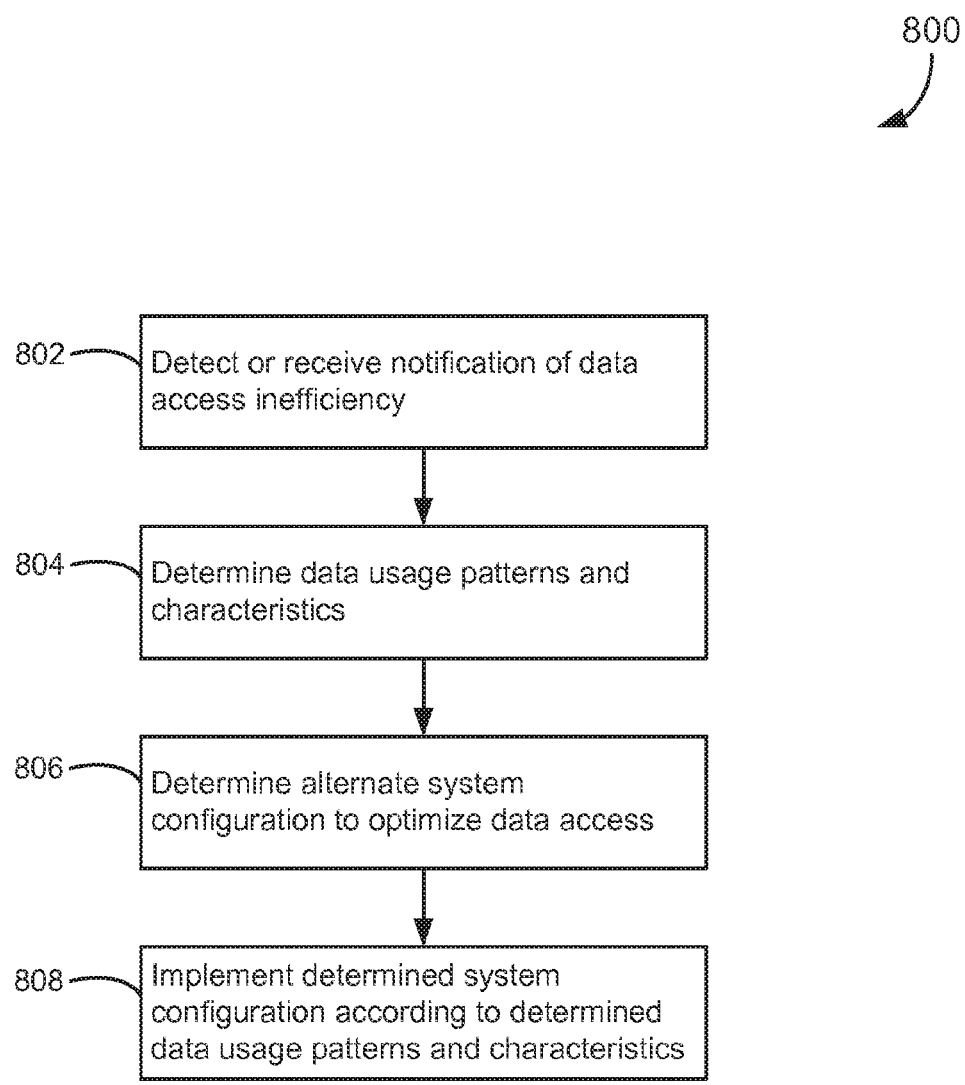
FIG. 8 illustrates an example process for optimizing data access in a distributed system, in accordance with an embodiment.

FIG. 8 illustrates an example process 800 for optimizing data access upon storage systems in accordance with some embodiments. At step 802, an entity detects, by various mechanisms, or is informed of an inefficiency or suboptimal performance and/or availability in or when accessing a range of data from the storage system described in various contexts elsewhere in this disclosure. The entity for implementing example process 800 is, in some embodiments, the map authority. In alternative embodiments, the functionality of process 800 may be implemented by any appropriate entity, including but not limited to a client, a data mapping engine, or a placement engine, as discussed at least in connection with FIG. 1 above. As may be contemplated, the inefficiency may manifest as data inaccessibility and thus may include and/or incorporate elements of process 700 as applicable. In various embodiments, the detected inefficiency may relate to the data and includes but is not limited to suboptimal access latency, low data throughput, or low input/output operations per second (IOPS) relative to customer demand for the data. In some embodiments, the inefficiency may involve suboptimal system utilization such as underutilized or overcommitted system resources, including that of the storage system, the client, or the overall distributed environment described in connection with FIG. 2. Various external entities may report the inefficiency to the entity implementing process 800, the implementing entity may make the determination of inefficiency on its own, or the detection may include both notifications from external sources as well as a determination by the implementing entity itself. In some embodiments, a requestor, such as a client, directly informs the entity, such as a data mapping engine, that, for example, higher IOPS for a given set or subset or data is required, or that a given set or subset of data is very frequently accessed relative to other stored data, and thus forms a "hot spot."

The entity determines data usage patterns relating to the data upon the system 804, determines, based at least in part on the data usage patterns, an alternative system configuration for addressing and at least partially correcting the inefficiency 806, then implements the configuration 808. The data usage pattern may, in some embodiments, be specific to a requesting client or set of clients, or may be determined in the context of the broader storage system or distributed computing system. For example, the entity may be informed that, or alternatively, determine that based on a history of a client's data access, a certain chunk of data is accessed very frequently and thus constitutes a "hot spot." The entity may then optimize access to that data by locating a storage node or nodes with high IOPS capability, such as a storage node with a high proportion of solid state drives, then moving the data to that storage node. As another example, an entity may determine that the data stored upon the storage system is disproportionately concentrated upon a small number of storage nodes and that some storage nodes are being unnecessarily underutilized. The entity may redistribute the data according to its determination of an optimal configuration for that data. The examples presented herein are not intended to be limiting in any way. It is contemplated that the implementation of the optimal system configuration in step 808 includes, in some embodiments, techniques for updating an LBA map as discussed at least in connection with FIG. 6.

Figure 9:
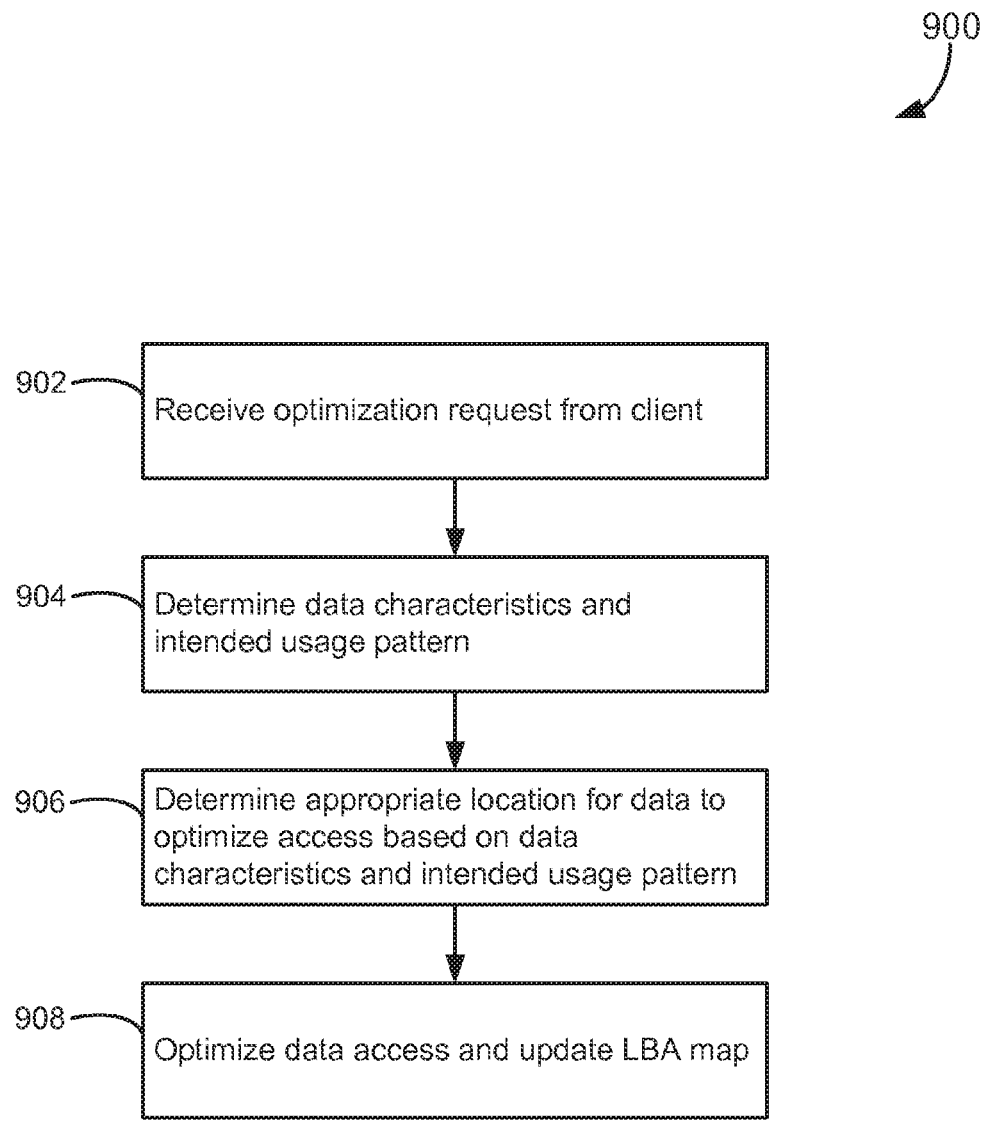
FIG. 9 illustrates an example client-initiated process for optimizing data access in a distributed system, in accordance with an embodiment.

FIG. 9 illustrates an example process 900 for optimizing data access and storage based on information about a requestor's usage of the data. At step 902, an entity, in some embodiments the placement engine, is consulted by a data-requesting entity, which in some embodiments is the client, to optimize data access by, e.g., moving a volume upon which data resides. In alternative embodiments, the requestor may be any entity implementing an active LBA map, such as a data mapping engine implemented outside of the client. In some embodiments, the entity implementing process 900 may be any entity appropriate for implementing the functionality described herein. For example, a map authority may consult a placement engine at step 902 when the map authority determines that stored data should be moved. For clarity of example, an embodiment where the entity described is a placement engine and the requestor is a client implementing a data mapping engine will be described herein, although not intended to be limiting in any way.

Upon receiving the request, which may be either a read or a write, the placement engine determines various characteristics of the stored data 904. Such a determination may, in some embodiments, be aided by information from the client regarding its intended use for the data, or any other information as appropriate. The characteristics determined may include, but are not limited to, data compressibility, data fragmentation, size of the data range, intended usage pattern, and intended frequency of data access. For example, the client may inform the placement engine, or the placement engine may determine based on a comparison with its determined information about the client's data usage patterns, that a certain range or extent of stored data will be a frequently accessed "hot spot," similarly to described in connection with FIG. 8. As may be appreciated, the placement engine may be able to predict, based on its tracking of a client's data access history as analyzed by an implemented set of heuristics, a client's future usage patterns for a given set of data. The placement engine may use either or both these predictions and/or a client's notification to the placement engine of its intended access pattern for determining, at step 906, what storage node or set of storage nodes would best service requests for the data in question. In some embodiments, the placement engine has information about various operational parameters of the storage system, the larger distributed system, and/or the status of various components located therein, such as network topologies, storage node capabilities, system usage patterns and availability, and the like. The placement engine may use this information to determine an optimal location for the data. For example, the placement engine may be aware that two storage nodes capable of servicing data with a high expected IOPS requirement exist within the general system, and may select the node nearest to the client to further reduce latency. As another example, the placement engine may determine all of the storage nodes upon which the requested data exists, and select the storage node able to service data requests of a type determined to be executed at a high frequency (e.g., as predicted by the placement engine or informed by the client) in a fashion mostly closely matching the intended use, e.g., highest sustained throughput, lowest latency, or the like. Upon determining an optimal location for the data, the placement engine performs the optimization, e.g., by moving or copying a subset of the data to different storage nodes and/or devices, and updates or requests the update of an LBA map with the new configuration(s) or location(s) 908. In some embodiments, the updated LBA map is submitted to the client according using the techniques described at least in conjunction with FIG. 6. In some embodiments, step 908 may constitute a request to update an LBA map residing upon the client and implemented by the data mapping engine.

Figure 10:
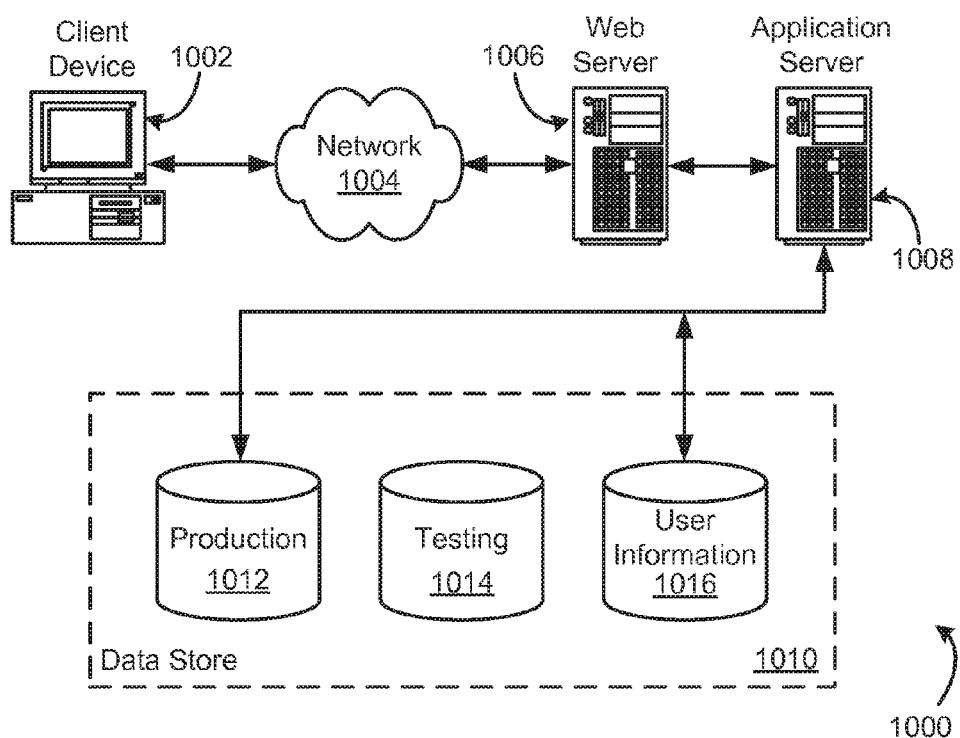
FIG. 10 illustrates an environment in which various embodiments can be implemented.

FIG. 10 illustrates an example of an environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out various embodiments. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for merging data, comprising:

under control of one or more computer systems configured with executable instructions, implementing at least one technique for identifying changed data, the changed data being accessible to a client entity of the one or more computer systems;

while reassigning, by the client entity, the data from a first storage node that is inaccessible to the client entity to a second storage node, receiving, by the client entity, a notification that access by the client entity to the first storage node has been at least partially restored;

determining, by the client entity and using at least in part information from the at least one technique for identifying changed data, whether reassigned data on the second storage node has been modified by the client entity; and when the reassigned data on the second storage node has been modified, determining, by the client entity and using at least in part information from the at least one technique for identifying changed data, a subset of the reassigned data that has been modified;

determining, by the client entity and at least in part by processing, by the client entity, the modified subset of reassigned data, whether to complete the data reassignment; and when determined by the client entity that the data reassignment should be completed, then completing the data reassignment, and when determined by the client entity that the data reassignment should be not be completed, then merging, by the client entity and using at least the information from the at least one technique for identifying changed data, the reassigned data on the second storage node with original data on the first storage node, both the reassigned data and the original data are accessible on the first storage node by the client entity.

2. The computer-implemented method of claim 1, wherein the technique for identifying changed data is a write journal that is implemented on the client entity.

3. The computer-implemented method of claim 1, wherein the technique for identifying changed data is a write journal that is implemented on at least one of the first storage node or the second storage node.

4. The computer-implemented method of claim 1, wherein the technique for identifying changed data is an implementation of at least one data differencing procedure.

5. The computer-implemented method of claim 1, wherein implementing the technique for identifying changed data further comprises:
  associating consistency tags with subsets of the data;
  processing, by at least a hash function, the consistency tags to produce hashes; and
  organizing the hashes into at least one hash tree,
  wherein the information from the technique for identifying changed data is generated by processing the hash tree to determine which of the data subsets have been changed.

6. The computer-implemented method of claim 1, wherein determining whether to complete the data reassignment is further based at least in part on characteristics of the client's access to the second storage node.

7. A computer-implemented method for merging data, comprising:
  under control of one or more computer systems configured with executable instructions,
  implementing at least one technique for identifying changed data that is stored on a storage system, the changed data being accessible to a client instance of the one or more computer systems;
  determining, by a device of the one or more computer systems and at least using information from the implemented at least one technique for identifying changed data, whether an initial configuration of the storage system should be restored;
  when determined by the device that the initial configuration should be restored, then restoring the initial configuration by at least:
  merging, by the device and at least using information from the at least one technique for identifying changed data, a modified subset of the data with an unmodified subset of the data, thereby creating a merged set of data;
  providing, by the restored initial configuration, the client instance access to the merged set of data; and
  updating a mapping, the mapping being configured to enable, by associating client data requests with corresponding locations of the stored data on the storage system, access by the client instance to the merged set of data.

8. The computer-implemented method of claim 7, wherein the storage system includes data volumes that are accessible by a plurality of client instances, and wherein the data volumes are implemented by a plurality of data storage devices.

9. The computer-implemented method of claim 7, further comprising:
  while reassigning the data from a first storage node of the storage system that is inaccessible to a client instance to a second storage node of the storage system, receiving a notification that access by the client instance to the first storage node has been at least partially restored,
  wherein the initial configuration of the storage system includes at least the first storage node.

10. The computer-implemented method of claim 9, further comprising, when determined that the initial configuration should not be restored, then completing the reassignment of the data to the second storage node.

11. The computer-implemented method of claim 9, wherein the second storage node is accessible to the client instance.

12. The computer-implemented method of claim 7, wherein:
  the technique for identifying changed data is implemented by the client instance; and
  the client instance includes the device of the one or more computer systems.

13. A computer system for merging data, comprising: one or more processors; and
  memory, including instructions executable by the one or more processors to cause the computer system to at least:
  track at least one technique for identifying changed data stored on a storage system, the changed data being accessible to a client instance of the computer system;
  determine, by a device of the computer system and using information from the tracked at least one technique for identifying changed data, which storage configuration among a first storage system configuration and a second storage system configuration should be used to access the stored data;
  determine, by the device and using the at least one technique for identifying changed data, a subset of changed data from the stored data; and
  merge, by the device and using information from the tracked at least one technique for identifying changed data, the subset of changed data with data outside the subset, the merged data being accessible by the client instance using the determined storage configuration; and
  update a mapping, the mapping being configured to enable, by associating client data requests with corresponding locations of the stored data on the storage system, access by the client instance to the merged data.

14. The computer system of claim 13, wherein the tracked at least one technique for identifying changed data is at least one of a write journal, a data differencing algorithm, or a hierarchical tree of hashed consistency tags that are associated with chunks of the stored data.

15. The computer system of claim 13, wherein determining which storage configuration to use is further based at least in part on a length of time required to implement the first storage system configuration relative to a length of time required to implement the second storage system configuration.

16. The computer system of claim 13, wherein determining which storage configuration to use is further based at least in part on an amount of computer system resources required to implement the first storage system configuration relative to an amount of computer system resources required to implement the second storage system configuration.

17. The computer system of claim 13, wherein determining which storage configuration to use is further based at least in part on a difference in at least one ability to provide data access to the client instance between the first storage system configuration and the second storage system configuration.

18. One or more non-transitory computer-readable storage media having collectively stored thereon executable instructions that, when executed by one or more processors of a computing resource provider's computer system, cause the computer system to at least:
  retain at least one technique for identifying changed data that is stored on a storage system, the at least one technique for identifying changed data indicating whether the changed data that is stored on the storage system has been modified, the changed data being accessible to a client instance of the computer system; and in response to a notification that, while reassigning data from a first storage device that is inaccessible to the client instance to a second storage device, the first storage device becomes accessible to the client instance:

determine, by a device of the computer system and using the at least one technique for identifying changed data, an optimal storage device for providing the client instance access to the data, the optimal storage device being determined from among the first storage device and the second storage device;

copy, by the device and using the at least one technique for identifying changed data, modified data to the optimal storage device;

provide, by the device, information enabling the client instance to access the optimal storage device; and update a mapping, the mapping being configured to enable, by associating client data requests with corresponding locations of the data on the storage system, access by the client instance to the stored data.

19. The non-transitory computer-readable storage media of claim 18, wherein the instructions further cause the computer system to determine, by at least processing the at least one technique for identifying changed data, whether at least one subset of data has been modified.

20. The non-transitory computer-readable storage media of claim 19, wherein the instructions further cause the computer system to determine, when determined that at least one subset of data has been modified and by at least processing the at least one technique for identifying changed data, the at least one subset of modified data from the stored data.

21. The non-transitory computer-readable storage media of claim 18, wherein the instructions further cause the computer system to:

associate consistency tags with chunks of the stored data;

apply a hash function to the consistency tags to generate associated hashes;

organize the hashes into a hash tree; and generate, by at least processing the hash tree, metadata that indicates which of the data chunks has been modified.

22. The non-transitory computer-readable storage media of claim 18, wherein:

the computer system is a network of computing resources that includes the client instance and the device;

the client instance includes at least the device; and the instructions cause the device of the client instance to at least:

retain the metadata; and determine the optimal storage device.

23. The non-transitory computer-readable storage media of claim 22, wherein the instructions further cause the computer system to update a mapping to include the optimal storage device, the mapping being used at least by the client instance to access the stored data.

* * * * *